United States Patent [19]

Hillis

[11] Patent Number: 4,878,109
[45] Date of Patent: Oct. 31, 1989

[54] UNSYNCHRONIZED MULTISPECTRAL VIDEO FILTERING SYSTEM WITH FILTER IDENTIFICATION SENSOR WITHIN FIELD OF VIEW AND VIDEO SIGNAL RESPONSIVE

[75] Inventor: W. Daniel Hillis, Cambridge, Mass.

[73] Assignee: Thinking Machines Corporation, Cambridge, Mass.

[21] Appl. No.: 154,490

[22] Filed: Feb. 8, 1988

Related U.S. Application Data

[63] Continuation of Ser. No. 846,729, Apr. 1, 1986, abandoned.

[51] Int. Cl.$^4$ ............................................. H04N 9/07
[52] U.S. Cl. ................................. 358/42; 358/98; 358/151
[58] Field of Search .................. 358/42, 43, 44, 98, 358/150, 151

[56] References Cited

U.S. PATENT DOCUMENTS

| | | | |
|---|---|---|---|
| 3,529,080 | 9/1970 | Nassimbene | 358/42 |
| 3,600,504 | 8/1971 | Reilly | 358/42 |
| 3,654,385 | 4/1972 | Flagle | 358/42 |
| 3,821,793 | 6/1974 | Carson | 358/42 |
| 4,242,703 | 12/1980 | Tsuboshima et al. | 358/42 |
| 4,593,313 | 6/1986 | Nagasaki et al. | 358/42 |
| 4,713,683 | 12/1987 | Fujimori et al. | 358/42 |
| 4,727,418 | 2/1988 | Kato et al. | 358/98 |

FOREIGN PATENT DOCUMENTS 58-43688  3/1983  Japan ...................... 358/42

Primary Examiner—James J. Groody
Assistant Examiner—Robert M. Bauer
Attorney, Agent, or Firm—Weingarten, Schurgin, Gagnebin & Hayes

[57] ABSTRACT

A video system for exposing a video camera to a field of view through a sequence of different filter elements. A position detection system is employed in order to identify which filter element is in the field of view without requiring synchronization between the filter elements and the camera system. The filter elements are rotated on a wheel in front of the camera lens by an unsynchronized motor, and wheel position is detected and used to trigger a frame buffer so that it fills with signals from a camera view through a particular unitary filter. The position detection system may include a coded marking on the wheel which is detected by a separate sensor or detection in the signal stream from the camera, or it may include means for sensing the filter characteristic in the video signal itself. A controller provides a request of video signals for a particular filter characteristic which operates in synchronism with the position sensor.

3 Claims, 1 Drawing Sheet

UNSYNCHRONIZED MULTISPECTRAL VIDEO FILTERING SYSTEM WITH FILTER IDENTIFICATION SENSOR WITHIN FIELD OF VIEW AND VIDEO SIGNAL RESPONSIVE

This application is a continuation of application Ser. No. 846,729 filed Apr. 1, 1986, now abandoned.

FIELD AND BACKGROUND OF THE INVENTION

The present invention relates to color video systems and in particular to color video systems in which sequentially filtered signals are asynchronously generated and subsequently framed.

In color video it is typical to separate colors in a field of view through a color wheel having plural color filters spun in the field of view of a video camera. The wheel spins synchronously at a rate slow enough to permit a full frame of video to be generated by the camera for each color in the wheel. The synchronous wheel motion permits the video stream from the camera to be identified by time of occurrence with the color of the filter in the field of view.

The requirement for synchronous driving of the color wheel means that the system cannot properly separate colors in cases where there is disturbance to synchronization, and further involves the use of expensive synchronous motors and synchronous excitation run at an appropriate frequency.

In other applications it is desirable to be able to position one of several filter characteristics in the field of view of a video camera to accommodate different transmissivity needs in scenes of greatly varying luminosity as is found in applications to rocket photography, or to respond to different polarization characteristics of incident light or other radiation without the need for complex synchronous spin systems.

BRIEF SUMMARY OF THE INVENTION

In accordance with the teaching of the present invention, a video camera system is presented in which a video signal stream from an asynchronously filtered field of view is correlated to the filter characteristic by a position sensor on the filter that provides direct identification of the filter in place at any point in the stream.

In particular, a black and white video camera is placed in the field of view of a scene to be sensed. A rotating filter wheel is placed in the field of view and typically includes four colors in each of four quadrants of the wheel to permit the generation by the camera of four sequential video streams, one for each of the four colors used to fully identify the color components of the scene. The wheel includes indicia on its periphery that are sensed by a photosensor that in turn provides signals that identify which color is in the field of view at any one time. A detector system responds to the photosensor signal to cause a frame buffer to respond to the camera output and to begin to assemble in the frame buffer the camera output at a time that insures the buffer will contain a full frame of one color, or other filter characteristic. A computer control is additionally provided to permit computer generation of a request for an identifiable color to be registered in the frame buffer. This request is processed for coincidence with the photosensor output for that color and the coincidence in turn activates the assembly of a frame of the video stream in the buffer.

Alternatives in the system include the detection of the filter identifying indicia in the video signal itself or from the identifiable filter characteristic in the video output signals. The filters may be of different colors, different attentuations to accommodate scenes of great luminence contrast or of different polarizations to permit polarity analysis.

DESCRIPTION OF THE DRAWING

These and other features of the present invention are more fully set forth in the solely exemplary detailed description and accompanying drawing of which.

DETAILED DESCRIPTION

The present invention contemplates a multiply filtered video signal that is identified as to what filter is in place at any one time in the video signal stream by detecting the filter position, avoiding the use of synchronous filter drives.

Figure 1:
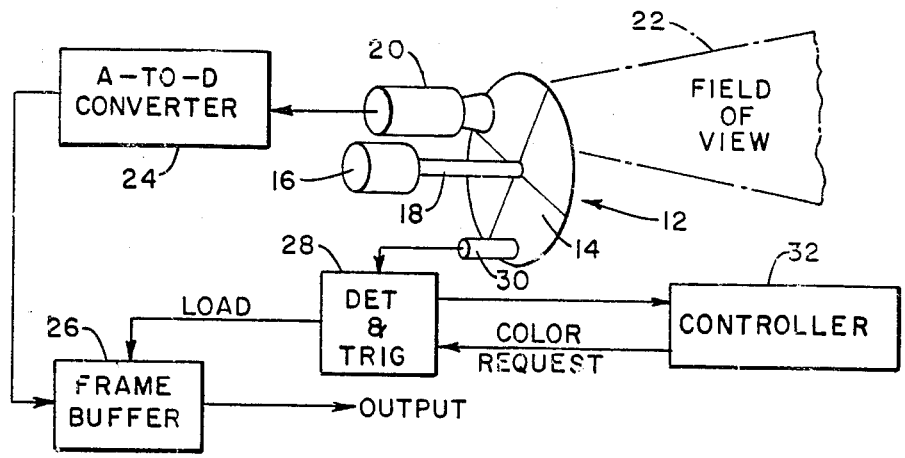
FIG. 1 is a diagrammatic view of a filter characteristic separating video system of the present invention.

With particular reference to FIG. 1 of the drawing, a filter wheel 12 has quadrants 14 at least some of which possess a different filter characteristic. The filter characteristic may be color, attenuation, polarization or any other desired filter characteristic. The wheel 12 is driven by an asynchronous motor 16 through a shaft 18 at a desired rate which need not be critically controlled, thus simplifying the motor and any drive electronics.

A typically black and white video camera 20 is positioned to view a field of view 22 sequentially through each of the filters in the quadrants 14 and to provide its video output signal through an analog-to-digital converter 24 to a frame buffer 26 capable of responding on demand to the digitized video to assemble a frame of video from the camera 20. The command to load or assemble the frame of video is provided by a detector and trigger 28 that responds to a signal from a photosensor 30 that is positioned to sense markings on the wheel 12 that identify which of the quadrants' filters are in the field of view at any given time. The detector and trigger 28 responds to the photosensor signal to indicate when the field of view becomes exposed to the camera 20 through a particular filter in the wheel 12. A controller 32 of a computer system further provides an indication of which of the filters it is desired to view the scene through next. The detector 28 identifies the coincidence between the requested filter and the time when that filter moves into the field of view and generates a trigger signal to the frame buffer 26 that causes it then to commence loading and assembling a frame of video from the camera 20.

Figure 2:
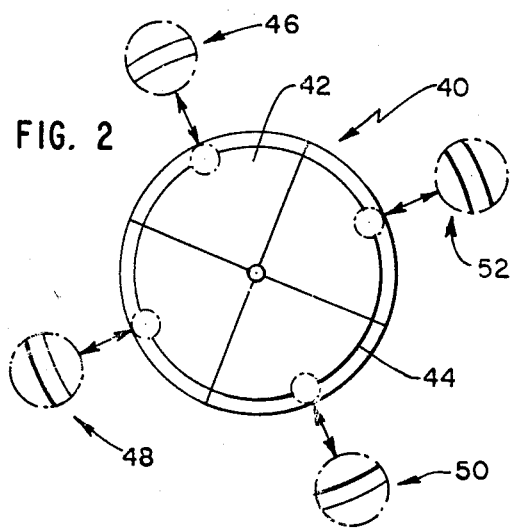
FIG. 2 is an expanded view of one form of a filter wheel according to the invention.

FIG. 2 illustrates a typical marking system for the wheel. As shown there a filter wheel 40 has quadrants 42 which contain peripheral marking bands 44. Portions of the bands 44 are expanded in the view of FIG. 2 in segments 46, 48, 50 and 52. The marking scheme is made up of two bands to identify each quadrant. Each band is either broad or narrow, the combination of which uniquely identifies each quadrant as follows: narrow-narrow; narrow(inner)-broad(outer); broad(inner)-narrow(outer); broad-broad. The photodetector 30 of FIG.

1 would then include the ability to provide a four state output that in the detector 28 is resolved to indicate which filter is in the field of view.

Figure 3:
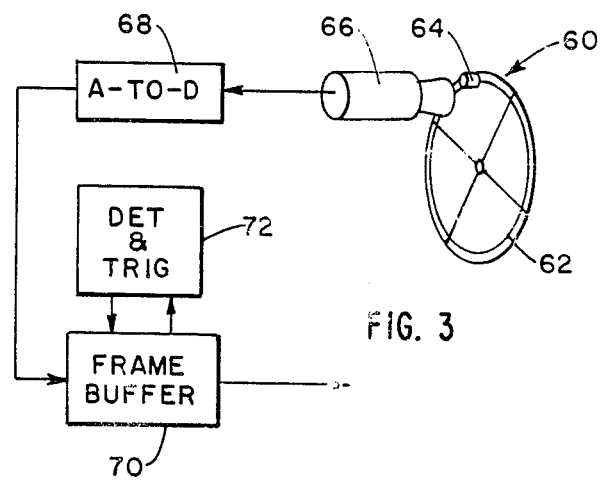
FIG. 3 is a diagrammatic view of one alternative of the present invention.

In FIG. 3 there is shown an alternative to the filter position detector of FIG. 1 in which a filter wheel 60 has marking bands 62 that are photoelectrically sensed through a lens 64 by a camera 66 in a peripheral portion of a field of view from the camera 66. The output of the camera is applied through an analog-to-digital converter 68 to a frame buffer 70. A detector and trigger circuit 72 responds to an indication of the particular markings in the field of view by circuitry within the frame buffer 70 or the computer associated with the controller of FIG. 1.

Figure 4:
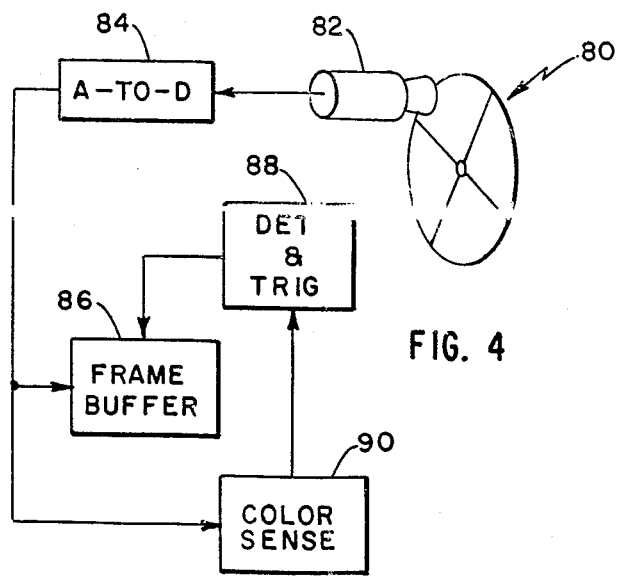
FIG. 4 is a diagrammatic view of a further alternative of the present invention.

FIG. 4 shows a further alternative in which a filter wheel 80 is placed in the field of view of a camera 82 and the output of the camera 82 is applied through an analog-to-digital converter 84 to a frame buffer 86. A color sense circuit 90 is associated with a computer and directly senses which filter is in the field of view by the nature of the video signal itself. The color sense circuit 90 identifies to the detector and trigger circuit 88 the filter nature permitting the frame buffer in turn to load and assemble the video signal corresponding to the desired filter characteristic.

Other forms of selective filter systems may be used and different applications selected as well amoung other modifications to which the present invention is equally applicable. Accordingly, the present invention is to be identified in scope only as indicated in the following claims.

I claim:

1. A video system for identifying boundaries of sequentially filtered video signals comprising:
    video camera means for providing video output signals from a field of view;
    means for passing a sequence of filters between said video camera and the field of view thereby filtering said field of view resulting in a video output signal which includes a sequential stream of filtered signals, each signal having a distinguishable video characteristic representative of one of the filters in the sequence of filters;
    means for assembling said stream of filtered signals into a unitary representation of said field of view;
    means for sensing a position of the sequence of filters to identify which filter is in the field of view;
    means, operative in response to the sensed filter position, for causing said assembling means to assemble said stream of filtered signals, providing a video output signal assembled according to which filter in said sequence of filters is in the field of view;
    means for providing request signals for assemblying video signals each request signal corresponding to a selected filter; and
    means for operating said causing means in response to coincidence of said request signals and sensing of the corresponding filter being in the field of view.

2. A video system for identifying boundaries of sequentially filtered video signals comprising:
    video camera means for providing video output signals from a field of view;
    means for passing a sequence of filters between said video camera and and the field of view thereby filtering said field of view resulting in a video output signal which includes a sequential stream of filtered signals, each signal having a distinguishable video characteristic representative of one of the filters in the sequence of filters;
    means for assembling said streams of filtered signals into a unitary representation of said field of view;
    means for sensing a position of the sequence of filters to identify which filter is in the field of view;
    means, operative in response to the sensed filter position, for causing said assembling means to assemble said stream of filtered signals, providing an assembled video output signal assembled according to which filter in said sequence of filters is in the field of view;
    said position sensing means including means responsive to the video output signals, for identifying which one of the filters of said sequence is in the field of view.

3. The video system of claim 2 wherein said identifying means includes:
    means within the field of view for uniquely identifying said filters one from the other.

* * * * *